(12) United States Patent
Nashburn et al.

(10) Patent No.: US 7,117,668 B2
(45) Date of Patent: Oct. 10, 2006

(54) METHOD AND APPARATUS FOR RAPID EXHAUST CATALYST LIGHT-OFF

(75) Inventors: Richard F. Nashburn, Honeoye Falls, NY (US); John E. Kirwan, Troy, MI (US); Michael R. Salemi, Rochester, NY (US); Malcolm J. Grieves, Fairport, NY (US)

(73) Assignee: Delphi Technologies, Inc, Troy, MI (US)

( * ) Notice: Subject to any disclaimer, the term of this patent is extended or adjusted under 35 U.S.C. 154(b) by 6 days.

(21) Appl. No.: 10/683,010

(22) Filed: Oct. 10, 2003

(65) Prior Publication Data

US 2005/0076636 A1    Apr. 14, 2005

(51) Int. Cl.
  *F01N 3/00*  (2006.01)
(52) U.S. Cl. ............... 60/286; 60/289; 60/291; 60/292; 60/293; 60/303; 123/1 A; 123/3
(58) Field of Classification Search ............... 60/274, 60/286, 289, 290, 291, 292, 293, 295, 303; 123/1 A, 3
See application file for complete search history.

(56) References Cited

U.S. PATENT DOCUMENTS

| | | | |
|---|---|---|---|
| 3,828,736 A * | 8/1974 | Koch ............... | 123/3 |
| 3,915,125 A * | 10/1975 | Henkel et al. ........ | 123/3 |
| 4,125,090 A * | 11/1978 | Masunaga et al. ..... | 123/3 |
| 4,299,089 A * | 11/1981 | Takeda ............. | 60/290 |
| 5,357,908 A | 10/1994 | Sung et al. | |
| 5,943,859 A * | 8/1999 | Kawamura .......... | 60/320 |
| 6,041,593 A | 3/2000 | Karlsson et al. | |
| 6,044,643 A * | 4/2000 | Ittner et al. ......... | 60/289 |
| 6,230,494 B1 * | 5/2001 | Botti et al. ......... | 60/649 |
| 6,526,950 B1 * | 3/2003 | Ito et al. ........... | 123/518 |
| 6,609,582 B1 * | 8/2003 | Botti et al. ........ | 180/65.3 |
| 6,997,142 B1 * | 2/2006 | Wakao et al. ........ | 123/3 |

FOREIGN PATENT DOCUMENTS

| | | |
|---|---|---|
| DE | 102 12 021 | 10/2003 |
| EP | 1 275 839 | 1/2003 |
| EP | 1 300 558 | 4/2003 |
| WO | 99/04145 | 1/1999 |

OTHER PUBLICATIONS

European Search Report dated Jun. 15, 2005.

* cited by examiner

*Primary Examiner*—Binh Q. Tran
(74) *Attorney, Agent, or Firm*—Paul L. Marshall

(57) ABSTRACT

An internal combustion engine is supplied with reformate from a hydrocarbon reformer at engine start-up and during engine warm-up. The reformate fuel mixture is fuel-lean at start-up to ensure that all the fuel is burned while the exhaust converter is thermally non-functional. Shortly after start-up, the mixture is changed to be fuel-rich, providing unburned reformate fuel in the exhaust stream. During start-up and warm-up, the output of an air pump is controllably divided between the reformer (primary air) and the engine exhaust system (secondary air). Unburned reformate from the engine and secondary air from the air pump ignite and thereby rapidly heat the converter. Gasoline or diesel fueling of the engine by fuel injection is preferably delayed until the engine and the converter both reach operating temperatures, whereupon the engine is fueled by fuel injection and further reforming is terminated.

10 Claims, 3 Drawing Sheets

METHOD AND APPARATUS FOR RAPID EXHAUST CATALYST LIGHT-OFF

TECHNICAL FIELD

The present invention relates to control of noxious emissions from internal combustion engines; more particularly, to method and apparatus for rapid light-off of an engine exhaust catalyst; and most particularly, to method and apparatus for using a liquid hydrocarbon reformer and a single air pump to provide hydrogen-rich fuel at engine start-up and to provide secondary air directly to the exhaust catalyst for rapid catalyst heating to light-off temperature.

BACKGROUND OF THE INVENTION

Most internal combustion engines today, and especially engines used for vehicle motivation, are equipped with catalytic exhaust converters for oxidizing unburned hydrocarbon fuel. Such converters are known to be highly efficient after being heated to an exhaust operating temperature of several hundred degrees Celsius. A problem exists, however, during the start-up and warm-up phases of engine operation. Because the engine is cold, combustion of the fuel/air mixture is sub-optimal, resulting in relatively high levels of unburned fuel in the exhaust, while simultaneously the exhaust catalyst is also sub-optimal cool and therefore ineffective or inefficient in oxidizing the abundant hydrocarbons in the exhaust.

It is known to use hydrogen enrichment of the fuel for an internal combustion engine to enable very low tailpipe emissions. Such a system is based on having an on-board catalytic fuel reformer for generating hydrogen-rich reformate from hydrocarbon-containing engine fuel. It is further known to fuel an engine upon start-up with a very fuel-lean reformate mixture (enabled by the wide flammability limits of reformate) while also supplying reformate directly to the engine exhaust. However, supplying reformate to both the engine intake and the engine exhaust simultaneously is a difficult challenge because of a significant pressure difference between these two locations. During engine idle, for example, in a spark ignition engine, a typical value for pressure in the engine intake is about 40 kPa, while a typical value of exhaust pressure is about 100–105 kPa. This difference becomes even greater as the air intake throttle is progressively opened, reducing intake manifold pressure and increasing exhaust manifold pressure.

It is further known to provide both a primary air pump for supplying primary air to the engine and a secondary air pump for supplying secondary air directly to the exhaust.

It is a principal object of the present invention to minimize exhaust emissions from an internal combustion engine during start-up and warm-up phases of engine operation.

It is a further object of the invention to minimize the cost and complexity of a system for controlling exhaust emissions during engine start-up and warm-up.

It is a still further object of the invention to provide such a system comprising a single air pump.

SUMMARY OF THE INVENTION

Briefly described, an internal combustion engine is supplied with reformate from a hydrocarbon reformer at engine start-up and during engine warm-up. Preferably, the reformate/air fuel mixture to the engine is very lean at start-up to ensure that all the fuel is burned, thereby minimizing any unburned fuel in the exhaust and minimizing NOx formation while the exhaust converter is thermally non-functional. Shortly after start-up, the mixture is changed to be very fuel-rich, immediately providing significant quantities of unburned reformate fuel in the exhaust. During start-up and warm-up, the output of a single air pump is controllably divided by valving between the reformer (primary air), wherein air is required for reforming, and the engine exhaust system (secondary air), wherein air is required for secondary combustion. The combination of unburned reformate from the engine and secondary air from the air pump creates a combustible mixture in the exhaust catalytic converter, which mixture ignites and thereby rapidly heats the catalytic converter to operating ("light-off") temperature. The sequence and action of valving, the air pump, and the reformer are controlled by an electronic controller. Gasoline or diesel fueling of the engine by fuel injection is preferably restricted by being delayed or minimized until the engine and the converter both reach steady-state operating temperatures, whereupon the reformate fueling fraction is set to an optimum value to provide good fuel economy and low engine emissions. This value may be as low as zero percent reformate fuel, depending on specific needs for vehicle operation.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
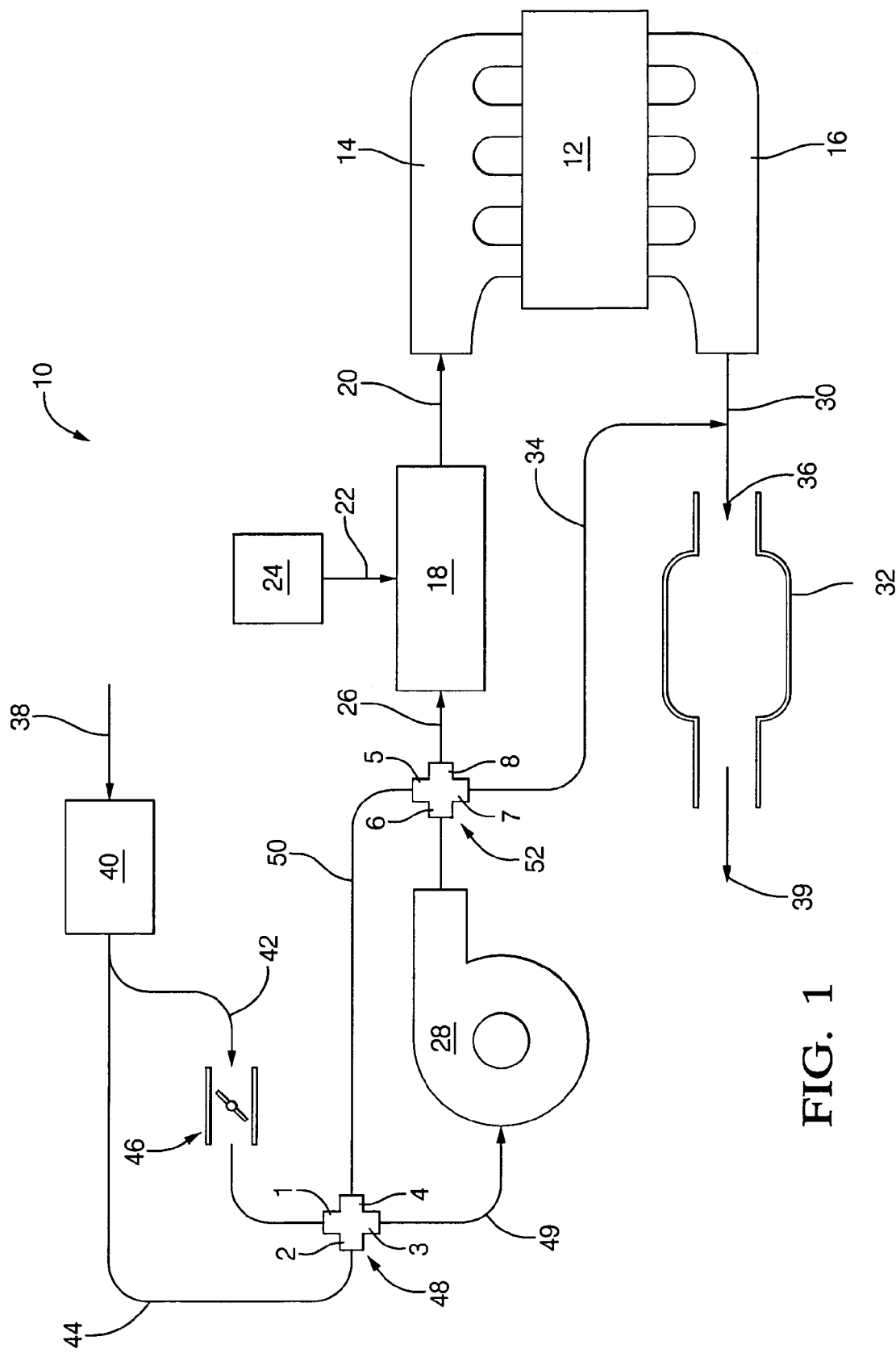
FIG. 1 is a schematic drawing of a first embodiment in accordance with the invention.
Figure 2:
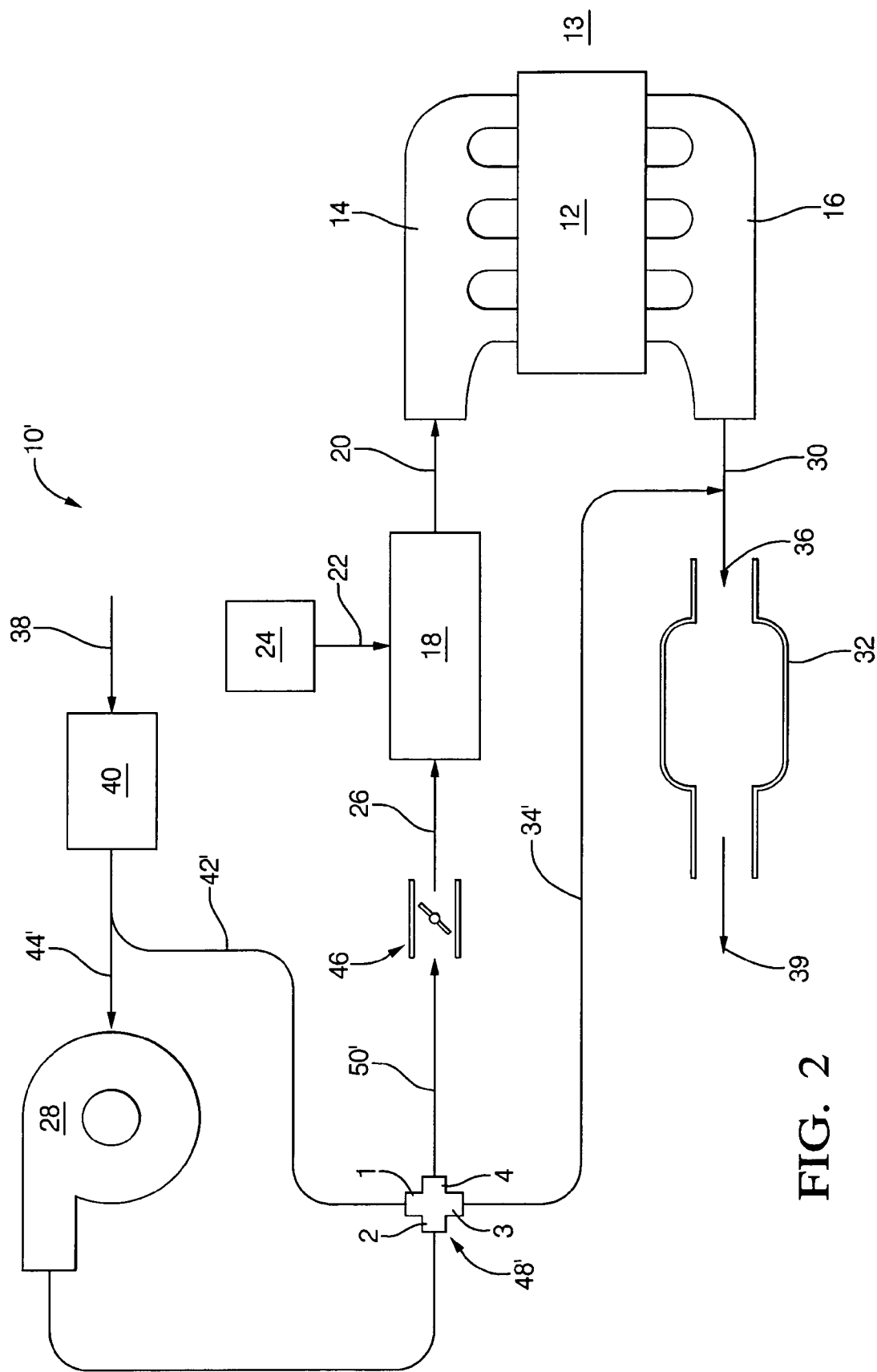
FIG. 2 is a schematic drawing of a second embodiment in accordance with the invention.
Figure 3:
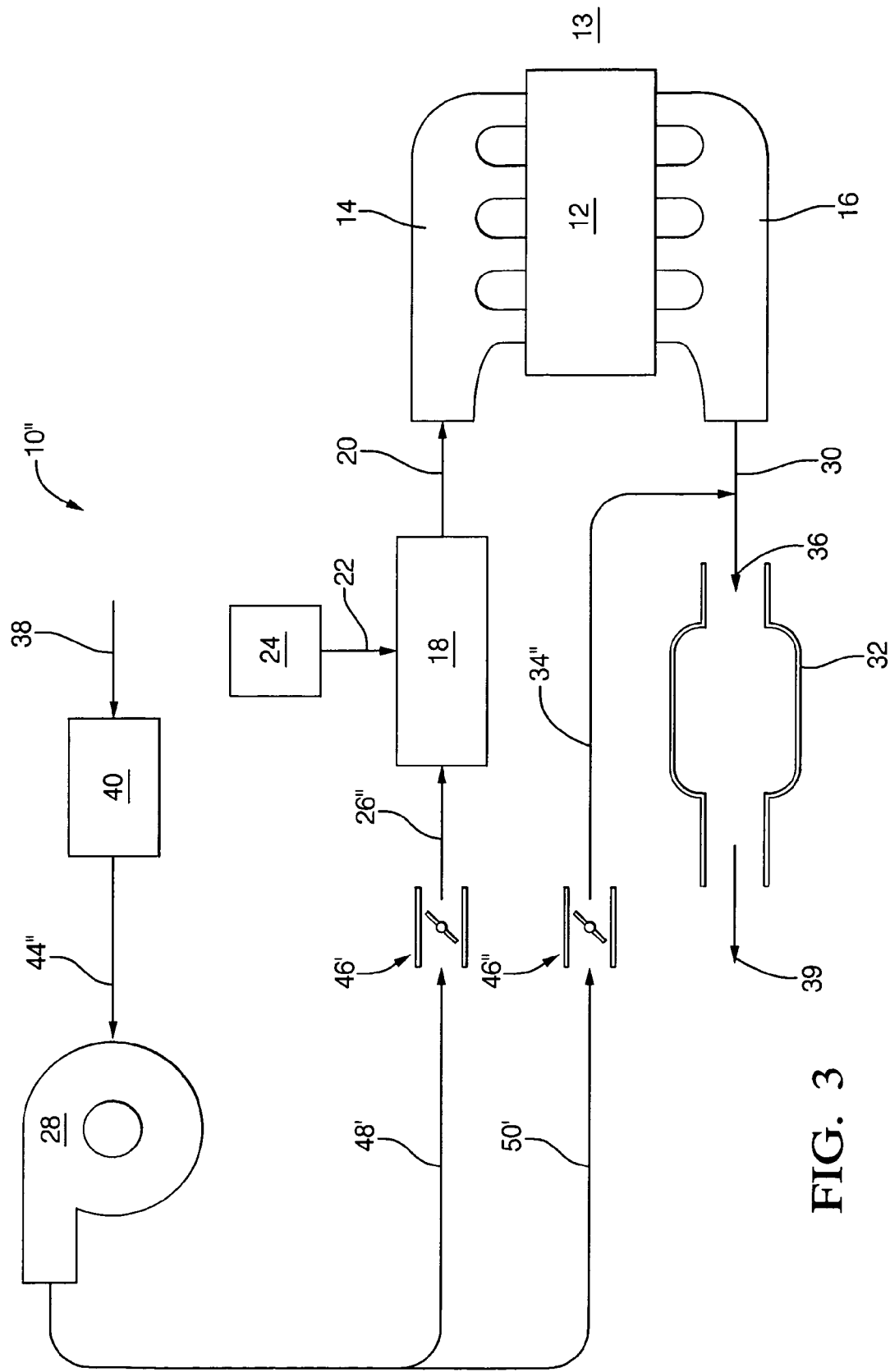
FIG. 3 is a schematic drawing of a third embodiment in accordance with the invention.

Referring to FIGS. 1, 2, and 3, in first embodiment 10, second embodiment 10', and third embodiment 10'', a conventional internal combustion engine 12 includes an intake manifold 14 and an exhaust manifold 16. Engine 12 may be a spark-ignited gasoline engine, such as a reciprocating engine or a rotary (Wankel) engine, or a compression-ignited engine such as a diesel engine. Engine 12 may be either two-stroke or four-stroke, and preferably is fuel injected rather than carbureted for reasons described below. Engine 12 may be motive engine for a vehicle 13, such as, for example, an automobile, truck, military vehicle, airplane, boat, or ship. A hydrocarbon catalytic reformer 18 is coupled to intake manifold 14 to provide a primary reformate/air fuel mixture 20 to intake manifold 14 for primary combustion in engine 12. Reformer 18 is supplied in known fashion with liquid hydrocarbon fuel 22, for example, gasoline or diesel fuel, from a fuel source 24. Reformer 18 is also supplied with primary air 26 from an air pump 28, as described below for the three individual embodiments. An exhaust stream 30 issues from exhaust manifold 16 and passes through a catalytic exhaust converter 32 in known fashion and to provide a clean engine exhaust 39. In each of the embodiments, a single air pump 28 is configured via appropriate valving to provide primary air 26 to reformer 18 as needed and to provide secondary air 34 into exhaust stream 30 to create a secondary combustible mixture 36 prior to its entrance into exhaust converter 32. In first and second embodiments 10,10' (FIGS. 1 and 2), air pump 28 is required for reformer 18 only during engine starting. After engine 12 has started, intake manifold vacuum provides the motive force for air delivery through the reformer, and air pump 28 is used exclusively for secondary air injection into the exhaust system for rapid exhaust catalyst heating.

Referring now to FIG. 1, intake air 38 enters preferably through a conventional air filter 40 and is divided into two flow paths 42,44, one of which is provided with an air flow control valve 46. Paths 42,44 are connected to adjacent inlet ports 1,2 of a first diverter valve 48. Outlet ports 3,4 are connected respectively via paths 49,50 to inlet ports 6,5 of a second diverter valve 52, path 49 incorporating air pump 28. Outlet port 8 of valve 52 is connected to the air inlet port of reformer 18, and outlet port 7 of valve 52 is connected into engine exhaust stream 30. The sequence and action of the diverter valves, the air pump, and the reformer are controlled by a conventional programmable electronic controller (not shown).

In operation, at engine start-up, first diverter valve 48 connects ports 1,3 and shuts off ports 2,4, and second diverter valve 52 connects ports 6,8 and shuts off ports 5,7, thereby providing air from air pump 28 solely to reformer 18. The leanness of reformate mixture 20 may be controlled conventionally as desired by air control valve 46. After engine 12 is started and vacuum has been established in intake manifold 14, first diverter valve 48 is switched to connect ports 1,4 and second diverter valve 52 is switched to connect ports 5,8, thereby providing air flow through air control valve 46 into reformer 18 without using air pump 28. Shortly after engine 12 is started, mixture 20 is stoichiometrically enriched in hydrogen by adjusting air control valve 46 to create unburned reformate fuel in catalytic converter 32. Ports 2,3 and ports 6,7 are respectively connected to provide air from air pump 28 into exhaust stream 30. Thus, embodiment 10, in accordance with the invention, utilizes a single air pump 28 to provide both primary reformate air for engine start-up and secondary exhaust air for rapid heating of the exhaust converter during engine warm-up.

Referring now to FIG. 2, as in embodiment 10 intake air 38 enters preferably through a conventional air filter 40 and is divided into two flow paths 42',44', one of which is provided with air pump 28. Paths 42',44' are connected to adjacent inlet ports 1,2 of a diverter valve 48'. Outlet port 3 of valve 48' is connected into engine exhaust stream 30 via line 34', and outlet port 4 of valve 48' is connected via line 50' and air control valve 46 to the air inlet port of reformer 18. The sequence and action of the diverter valve, the air pump, and the reformer are controlled by a conventional programmable electronic controller (not shown).

In operation, at engine start-up, diverter valve 48' connects ports 2,4 and shuts off ports 1,3, thereby providing air from air pump 28 solely to reformer 18. The leanness of reformate mixture 20 may be controlled conventionally as desired by air control valve 46. After engine 12 is started and vacuum has been established in intake manifold 14, diverter valve 48' is switched to connect ports 1,4 thereby providing air flow through air control valve 46 into reformer 18 without using air pump 28. Shortly after engine 12 is started, mixture 20 is stoichiometrically enriched in hydrogen by adjusting air control valve 46 to create unburned reformate fuel in catalytic converter 32. Ports 2,3 are connected to provide air via line 34' from air pump 28 into exhaust stream 30. Thus, embodiment 10', in accordance with the invention, utilizes a single air pump 28 to provide both primary reformate air for engine start-up and secondary exhaust air for rapid heating of the exhaust converter.

Referring to FIG. 3, third embodiment 10" employs no diverter valves and instead includes a second air control valve. Further, air pump 28 provides air to both the reformer and the exhaust stream during all modes of reformer operation. Intake air 38 enters preferably through a conventional air filter 40 and is directed via line 44" to the inlet of air pump 28. The output of air pump 28 is divided into two flow paths 48',50', one of which is provided with a first air flow control valve 46' and the other of which is provided with a second air flow control valve 46", outlet ports of the air control valves being connected respectively to the air inlet port of reformer 18 via line 26" and engine exhaust stream 30 via line 34". The sequence and action of the air pump, the air control valves, and the reformer are controlled by a conventional programmable electronic controller (not shown).

In operation, at engine start-up, second air control valve 46" is closed, thereby providing air from air pump 28 solely to reformer 18. The leanness of reformate mixture 20 may be controlled conventionally as desired by first air control valve 46'. Shortly after engine 12 is started, mixture 20 is stoichiometrically enriched in hydrogen by adjusting first air control valve 46' to create unburned reformate fuel in catalytic converter 32, and second air control valve 46" is controllably opened to provide air from air pump 28 into exhaust stream 30. Thus, embodiment 10", in accordance with the invention, utilizes a single air pump 28 to provide both primary reformate air for engine start-up and secondary exhaust air for rapid heating of the exhaust converter.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A system for rapid heating of a catalytic converter for an internal combustion engine during start-up and warm-up phases of engine operation, comprising:
    a hydrocarbon reformer operationally connected to said engine for providing reformate fuel to said engine; and
    an air flow control sub-system for controllably and variably supplying air into said reformer and into said converter via an exhaust stream, said sub-system including an air pump selectively connectable to said reformer and said exhaust stream, wherein said air flow control sub-system comprises at least one valve for selecting between a first air flow path from said air pump to said reformer and a second air flow path from said air pump to said exhaust stream.

2. A system in accordance with claim 1 wherein said air flow control sub-system comprises at least one valve for controlling flow of air into said reformer.

3. A system for rapid heating of a catalytic converter for an internal combustion engine during start-up and warm-up phases of engine operation, comprising:
    a hydrocarbon reformer operationally connected to said engine for providing reformate fuel to said engine; and
    an air flow control sub-system for controllably and variably supplying air into said reformer and into said converter via an exhaust stream, said sub-system including an air pump selectively connectable to said reformer and said exhaust stream, wherein said air flow control sub-system comprises:
    a) at least one valve for selectively providing air to said reformer through said air pump; and b) at least one valve for selectively providing air to said reformer by bypassing said air pump.

4. A system for rapid heating of a catalytic converter for an internal combustion engine during start-up and warm-up phases of engine operation, comprising:

a hydrocarbon reformer operationally connected to said engine for providing reformate fuel to said engine; and an air flow control sub-system for controllably and variably supplying air into said reformer and into said converter via an exhaust stream, said sub-system including an air pump selectively connectable to said reformer and said exhaust stream, wherein said air flow control sub-assembly comprises a valve for varying the supply of air to the reformer and thus the amount of reformate supplied to said engine such that the desired ratio or fuel to air to said engine is met.

5. A system in accordance with claim 4 wherein said ratio is fuel-lean at engine start-up and then is fuel-rich during at least a portion of said engine warm-up phase of engine operation.

6. An internal combustion engine, comprising a system for rapid heating of a catalytic converter during start-up and warm-up phases of engine operation, including a hydrocarbon reformer operationally connected to said engine for providing reformate fuel to said engine, and an air flow control sub-system for controllably and variably supplying air into said reformer and into said converter via an exhaust stream, said sub-system including an air pump selectively connectable to said reformer and said exhaust stream, wherein said air flow control sub-system comprises at least one valve for selecting between a first air flow path from said air pump to said reformer and a second air flow path from said air pump to said exhaust stream.

7. A vehicle comprising:

a) an internal combustion engine having a catalytic converter for an exhaust stream from said engine; and b) a system for rapid heating of said catalytic converter during start-up and warm-up phases of engine operation, said system including a hydrocarbon reformer operationally connected to said engine for providing reformate to said engine, and an air flow control sub-system for controllably and variably supplying air to said reformer and to said exhaust stream, said sub-system including an air pump selectively connectable to said reformer and said exhaust stream, wherein said air flow control sub-system comprises at least one valve for selecting between a first air flow path from said air pump to said reformer and a second air flow path from said air pump to said exhaust stream.

8. A method for rapid heating of a catalytic converter connected to an internal combustion engine for receiving and treating an exhaust stream therefrom, comprising the steps of:

a) providing a hydrocarbon reformer operationally connected to said engine for providing reformate fuel thereto;

b) providing an air pump selectively connectable to said reformer to provide primary air thereto and to said exhaust stream to provide secondary air thereto;

c) providing primary air from said air pump to said reformer at engine start-up;

d) discontinuing said air flow from said air pump to said reformer after said engine start-up, and thereafter providing said primary air to said reformer in response to a vacuum in an intake manifold of said internal combustion engine;

e) providing excess reformate fuel to said exhaust stream via said engine after said engine start-up;

f) providing air from said air pump to said exhaust stream after said engine start-up to form a combustible fuel mixture in said catalytic converter; and g) igniting said combustible fuel mixture in said catalytic converter to rapidly heat said converter to a thermal state wherein catalysis of unburned hydrocarbons from said engine can occur spontaneously.

9. A method in accordance with claim 8 comprising the further step of setting a reformate fueling fraction to said engine to an optimum value to provide a desired fuel economy and engine emissions level when said engine and said exhaust catalytic converter reach their respective normal operating temperatures.

10. A method in accordance with claim 9 comprising the further steps of:

a) restricting conventional fuel injection fueling of said engine by liquid hydrocarbon fuel until after said engine is started up by being fueled by said reformate fuel;

b) beginning conventional fuel injection fueling of said engine by liquid hydrocarbon fuel prior to said step of setting reformate fueling fraction to said optimum value; and c) continuing conventional fuel injection fueling of said engine by liquid hydrocarbon fuel after said step of setting reformate fueling fraction to said optimum value.

* * * * *